(12) United States Patent
Putnam et al.

(10) Patent No.: US 12,323,447 B2
(45) Date of Patent: Jun. 3, 2025

(54) TECHNIQUES FOR CLICKSTREAM TRACKING ACROSS BROWSER TABS

(71) Applicant: Kount Inc., Boise, ID (US)

(72) Inventors: Arthur Jacob Putnam, Boise, ID (US); Nathan Daniel Monnig, Boise, ID (US)

(73) Assignee: Kount Inc., Boise, ID (US)

( * ) Notice: Subject to any disclaimer, the term of this patent is extended or adjusted under 35 U.S.C. 154(b) by 215 days.

(21) Appl. No.: 18/252,364

(22) PCT Filed: Nov. 10, 2021

(86) PCT No.: PCT/US2021/072329
§ 371 (c)(1),
(2) Date: May 9, 2023

(87) PCT Pub. No.: WO2022/104341
PCT Pub. Date: May 19, 2022

(65) Prior Publication Data
US 2024/0015173 A1    Jan. 11, 2024

Related U.S. Application Data

(60) Provisional application No. 63/112,285, filed on Nov. 11, 2020.

(51) Int. Cl.
*H04L 9/40*        (2022.01)
*G06F 16/951*      (2019.01)
(Continued)

(52) U.S. Cl.
CPC ........ *H04L 63/1425* (2013.01); *G06F 16/951* (2019.01); *G06F 16/953* (2019.01);
(Continued)

(58) Field of Classification Search
CPC . H04L 63/1425; H04L 65/611; H04L 65/762; G06F 16/955; G06F 16/953; G06F 16/9566; G06F 16/951
See application file for complete search history.

(56) References Cited

U.S. PATENT DOCUMENTS 6,707,470 B1 * 3/2004 Sashihara ............. G06F 16/955
                                            707/E17.112
9,720,889 B1 * 8/2017 Kobyakov ............ G06F 40/143
(Continued)

OTHER PUBLICATIONS

Huang, et al., "Parallel Browsing Behavior on the Web", Proceedings of the 21st ACM conference on Hypertext and hypermedia, Jun. 2010, pp. 13-17.
(Continued)

*Primary Examiner* — Barbara B Anyan
(74) *Attorney, Agent, or Firm* — Kilpatrick Townsend & Stockton LLP

(57) ABSTRACT

System and methods track events associated with web browser activity along with corresponding browser tab identifiers. A web page is loaded in a browser tab based on a request to a Uniform Resource Locator (URL). A time is identified, and it is determined that a predetermined time interval has elapsed. A storage mechanism is queried to determine whether an event log stored to the storage mechanism contains a stored tab identifier for the browser tab. If the tab identifier is not stored to the event log, then a tab identifier is stored to the event log, mapped to the time and the URL. If the event log contains the stored tab identifier for the tab, then the event log is updated to include the time mapped to the tab identifier. The URL may also be updated if applicable. The event log is transmitted to a server computer for further analysis.

20 Claims, 8 Drawing Sheets

(51) Int. Cl.
   *G06F 16/953* (2019.01)
   *G06F 16/955* (2019.01)
   *G06F 16/957* (2019.01)
   *H04L 65/611* (2022.01)
   *H04L 65/75* (2022.01)

(52) U.S. Cl.
   CPC ........ *G06F 16/955* (2019.01); *G06F 16/9566* (2019.01); *G06F 16/957* (2019.01); *H04L 65/611* (2022.05); *H04L 65/762* (2022.05)

(56) References Cited

U.S. PATENT DOCUMENTS

| | | | | |
|---|---|---|---|---|
| 2003/0014531 | A1* | 1/2003 | Bodin | H04L 65/762 709/218 |
| 2010/0076910 | A1* | 3/2010 | Gao | G06F 16/951 706/46 |
| 2011/0239138 | A1 | 9/2011 | Galushka et al. | |
| 2013/0232399 | A1* | 9/2013 | Anick | G06F 40/134 715/205 |
| 2014/0019589 | A1 | 1/2014 | Ross et al. | |
| 2015/0281334 | A1* | 10/2015 | Ushiki | G06F 16/9566 709/203 |
| 2016/0294900 | A1* | 10/2016 | Agrawal | H04L 65/611 |
| 2018/0203711 | A1* | 7/2018 | Wagner | G06F 16/9566 |

OTHER PUBLICATIONS

Mackay, et al., "Exploring Multi-session Web Tasks", The 26th Annual Chi Conference on Human Factors in Computing Systems, Chi 2008, Conference Proceedings, Apr. 6, 2008, pp. 1187-1196.
PCT/US2021/072329, "International Search Report and the Written Opinion", Feb. 25, 2022, 14 pages.
Schmucker, "Web Tracking", SNET2 Seminar Paper -Summer Term, Jan. 2011, 12 pages.
International Application No. PCT/US2021/072329, "International Preliminary Report on Patentability", mailed May 25, 2023, 10 pages.

* cited by examiner

TECHNIQUES FOR CLICKSTREAM TRACKING ACROSS BROWSER TABS

CROSS-REFERENCE TO RELATED APPLICATIONS

This application claims the benefit and priority under 35 U.S.C. 119(e) of U.S. Provisional Application No. 63/112,285, filed Nov. 11, 2020 the contents of which is herein incorporated by reference in its entirety for all purposes.

TECHNICAL FIELD

The present disclosure relates generally to computer systems. More specifically, but not by way of limitation, this disclosure relates to clickstream tracking techniques that account for activity across browser tabs, which can provide improvements to analysis based on browser activity such as predictive modeling for fraud prevention or user authentication.

BACKGROUND

Clickstream tracking and analysis is a powerful tool for analyzing user behavior on web platforms. Clickstream data can be used for many purposes, such as passive user authentication (e.g. by comparing detected behavior with previously observed behavior of a user), bot detection, and detection of suspicious, anomalous, or malicious user behavior. Clickstream tracking traditionally suffers from inaccuracies and omissions based on factors such as limitations on storage permissions as well as limitations on the type of data that can be gathered during the clickstream tracking process.

SUMMARY

Certain aspects involve clickstream tracking techniques that account for activity across browser tabs. For example, a system includes one or more processors and one or more non-transitory memories coupled to the one or more processors, the one or more memories storing a storage mechanism comprising an event log and a plurality of instructions executable by the one or more processors to perform processing comprising loading a first web page in a browser tab based on a request to a first Uniform Resource Locator (URL) at a first time; identifying a second time and determining that a predetermined time interval has elapsed between the first time and the second time; responsive to determining that the predetermined time interval has elapsed, querying the storage mechanism and determining that the storage mechanism does not contain a stored tab identifier for the browser tab; storing a tab identifier for the browser tab, mapped to the second time and the first URL, to the event log in the storage mechanism; loading a second web page in the browser tab based on a request to a second URL at a third time; identifying a fourth time and determining that the predetermined time interval has elapsed between the third time and the fourth time; responsive to determining that the predetermined time interval has elapsed, querying the storage mechanism and determining that the event log contains the stored tab identifier for the browser tab; updating the event log to replace the second time with the fourth time and the first URL with the second URL; and transmitting the event log to a server computer for further analysis.

In some aspects, the predetermined time interval is a first predetermined time interval and the plurality of instructions are further executable by the one or more processors to perform processing comprising: identifying a fifth time and determining that a second predetermined time interval has elapsed between the fourth time and the fifth time; responsive to determining that the second predetermined time interval has elapsed, querying the storage mechanism and determining that the event log contains the stored tab identifier for the browser tab; and updating the event log in the storage mechanism to replace the fourth time with the fifth time.

In some aspects, the tab identifier is stored to both a local storage associated with a browser and to a session storage associated with the browser. In some aspects, the plurality of instructions are further executable by the one or more processors to perform processing comprising: responsive to determining that the event log contains the stored tab identifier for the browser tab, querying a local storage and identifying the stored tab identifier associated with a timestamp more recent than a threshold; generating a new tab identifier for a second tab; and storing an entry to the event log corresponding to the new tab identifier for the second tab.

In some aspects, the further analysis comprises analyzing a pattern of URLs, timestamps, and tab identifiers to check for anomalous browsing activity. In some aspects, the plurality of instructions are further executable by the one or more processors to perform processing comprising: purging tab identifiers from the storage mechanism based on a configured expiry time.

In some aspects, the plurality of instructions are further executable by the one or more processors to perform processing comprising generating the tab identifier for the browser tab.

Various embodiments are described herein, including methods, systems, non-transitory computer-readable storage media storing programs, code, or instructions executable by one or more processors, and the like.

These illustrative embodiments are mentioned not to limit or define the disclosure, but to provide examples to aid understanding thereof. Additional embodiments are discussed in the Detailed Description, and further description is provided there.

Figure 1:
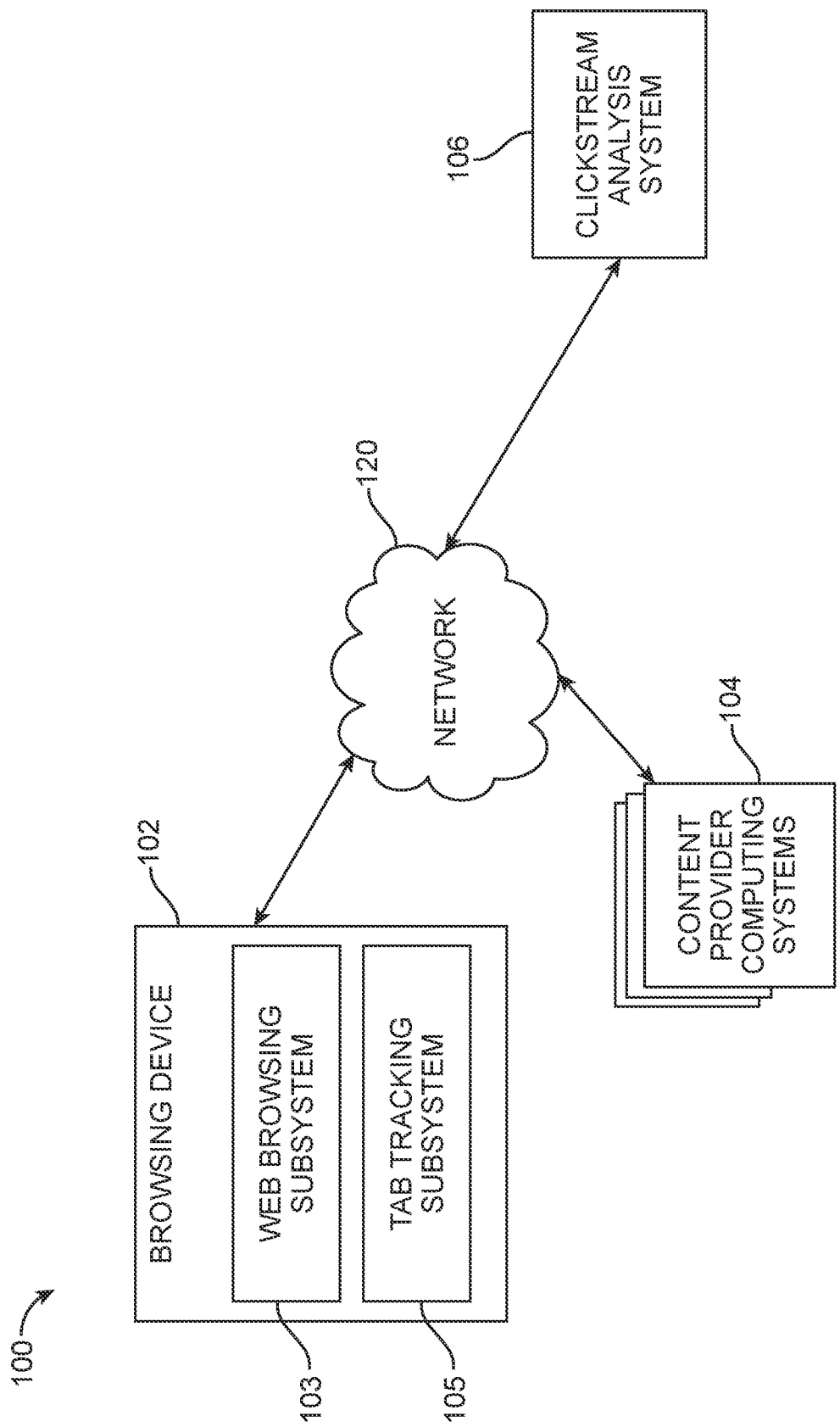
FIG. 1 is a block diagram of a system environment in which clickstream monitoring is executed across browser tabs, according to certain aspects of the present disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A computing system tracks events, which can correspond to online activity such as web page loads and views, while accounting for browser tabs used. The computing system assigns a tab identifier to a browser tab. As a user interacts with different web pages via different browser tabs, the browser tab data is collected and updated so that the event analytics performed based on the gathered event data has improved insight and accuracy.

As noted above, traditional clickstream tracking techniques have shortcomings including limitations as to where data can be stored and what data can be gathered. Traditional clickstream data tracking does not account for the use of different tabs, which can compromise the quality of the analytics performed based on the clickstream data. One use of such data is to analyze the amount of web pages being viewed and the rate at which different web pages are viewed. Typically, clickstream data includes information about page transitions, but not information about which page transitions occurred on which tab. This is useful information for tying together a user journey, which traditional clickstream processing is lacking.

Clickstream tracking strategies can involve collecting a set of pages viewed and timestamps associated to individual session identifiers. This information is used to infer a sequence of page views. This strategy may incorrectly infer page transitions from Hyper Text Transfer Protocol (HTTP) requests in the case of a user who opens and uses multiple browser tabs on the same website. For example, a user could alternate between two tabs, clicking hyperlinks in each tab before switching tabs. As the hyperlinked paths diverge between the two browser tabs, the system observes a sequence of HTTP requests from pages which may not contain direct hyperlinks. For cases in which a single session identifier being used, the system will infer many transitions between pages which may not contain direct links. As a result, the system may infer a highly anomalous user journey.

To address these issues and others, a computing system tracks each browser tab in an event log according to an assigned tab identifier. The tab identifiers are stored along with associated event data, which may include timestamps, Uniform Resource Locators (URLs), links clicked, content viewed, and other clickstream data. The tab identifier is configured to persist across page transitions on a browser tab. For example, as the user switches between web pages on a given browser tab, the tab identifier is persistent across transitions. If the user opens a new browser tab, a different tab identifier will be assigned, which also persists across page transitions on that browser tab.

The event log can then be used for collecting, tracking, and analyzing the user behavior. Assignment of each web page visit to the correct browser tab supports more accurate analysis and inference of user behavior. For example, the tab identifiers can be used to discern anomalous behavior of rapidly clicking on different links in one tab from traversing between tabs, which may not be indicative of anomalous activity. Additionally, including the tab identifiers in the event log can enrich the event data used for clickstream analysis, which can provide improved authentication and other analyses based on predictive modeling of event data. By leveraging tab tracking data for more accurate identification of anomalous behavior, the security of the system is improved. For example, more accurately discerning fraudulent or bot activity from legitimate user activity can prevent unauthorized access to sensitive protected data.

Example of a Computing Environment for Implementing Certain Aspects

Referring now to the drawings, FIG. 1 is a block diagram depicting an example of a computing environment 100 in which clickstream tracking is executed across browser tabs. FIG. 1 depicts examples of hardware components of the computing environment 100, according to some aspects. The computing environment 100 shown by FIG. 1 includes a browsing device 102, one or more content provider computing systems 104, a clickstream analysis system 106, and a network 120. The browsing device 102 executes a web browsing subsystem 103 that navigates to various web sites via browser tabs and a tab tracking subsystem 105 that tracks the browser activity and browser tabs used. The numbers of devices depicted in FIG. 1 are provided for illustrative purposes. Different numbers of devices may be used. For example, while various elements are depicted as single devices in FIG. 1, multiple devices may instead be used.

The browsing device 102 can communicate with various other computing systems, such as content provider computing systems 104 and the clickstream analysis system 106. For example, the browsing device 102 and content provider computing systems 104 may send data to the clickstream analysis system 106 to be processed. Alternatively, or additionally, the clickstream analysis system 106 and the content provider computing systems 104 may send signals to the browsing device 102 that control or otherwise influence different aspects of the browsing device 102 or the data it is processing. The browsing device 102 may also interact with content provider computing systems 104 and the clickstream analysis system 106 via one or more networks 120. For instance, an individual can use a browsing device 102, such as a laptop or other end-user device, to access an online service hosted by a content provider computing system 104. An electronic interaction between the browsing device 102 and a content provider computing system 104 can include, for example, the browsing device 102 sending an HTTP request to a content provider computing system 104, which transmits data to the browsing device 102 for rendering a web page in response.

The browsing device 102 is a computing device capable of receiving user input as well as transmitting and/or receiving data via the network 120. In one embodiment, a browsing device 102 is a computer system, such as a desktop or a laptop computer. Alternatively, the browsing device 102 may be a device having computer functionality, such as a personal digital assistant (PDA), a mobile telephone, a smartphone, or another suitable device. The browsing device 102 is configured to communicate via the network 120. In one embodiment, a browsing device 102 executes an application allowing a user of the browsing device 102 to interact with the content provider computing systems 104. For example, a browsing device 102 executes a web browsing subsystem 103, which can be a browser application that enables interaction between the browsing device 102 and the content provider computing systems 104 via the network 120. Alternatively, or additionally, the browsing device 102 interacts with the content provider computing systems 104 through a web browsing subsystem 103 in the form of an application programming interface (API) running on a native operating system of the browsing device 102, such as IOS® or ANDROID™.

The network 120 may comprise any combination of local area and/or wide area networks, using both wired and/or wireless communication systems. The network 120 may include network computers, sensors, databases, or other devices that may transmit or otherwise provide data to the computing environment 100. For example, the network 120 may include local area network devices, such as routers, hubs, switches, or other computer networking devices. The network 120 depicted in FIG. 1 can be incorporated entirely within (or can include) an intranet, an extranet, or a combination thereof. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). In one example, communications between two or more systems or devices can be achieved by a secure communications protocol, such as secure Hypertext Transfer Protocol ("HTTPS") communications that use secure sockets layer ("SSL") or transport layer security ("TLS"). In addition, data or transactional details communicated among the various computing devices may be encrypted. For example, data may be encrypted in transit and at rest.

One or more content provider computing systems 104 may be coupled to the network 120 for communicating with the browsing device 102. In one embodiment, a content provider computing systems 104 is an application provider communicating information describing applications for execution by the browsing device 102 or communicating data to the browsing device 102 for use by an application executing on the browsing device 102. In one embodiment, the content provider computing system 104 provides content or other information for presentation via the browsing device 102. The content provider computing systems 104 may be configured to serve web pages to the browsing device 102 to be displayed on the browsing device.

The content provider computing systems 104 may comprise web servers that link the respective content provider computing systems 104 via the network 120 to the browsing device 102, as well as to the clickstream analysis system 106. The content provider computing systems 104 serve web pages, as well as other content, such as JAVA®, FLASH®, XML and so forth. The web servers may receive and route messages between the content provider computing systems 104, the browsing device 102, and/or the clickstream analysis system 106. Additionally, a content provider computing system 104 may provide application programming interface (API) functionality to send data directly to native client device operating systems, such as IOS®, ANDROID™, or BlackberryOS.

Figure 2:
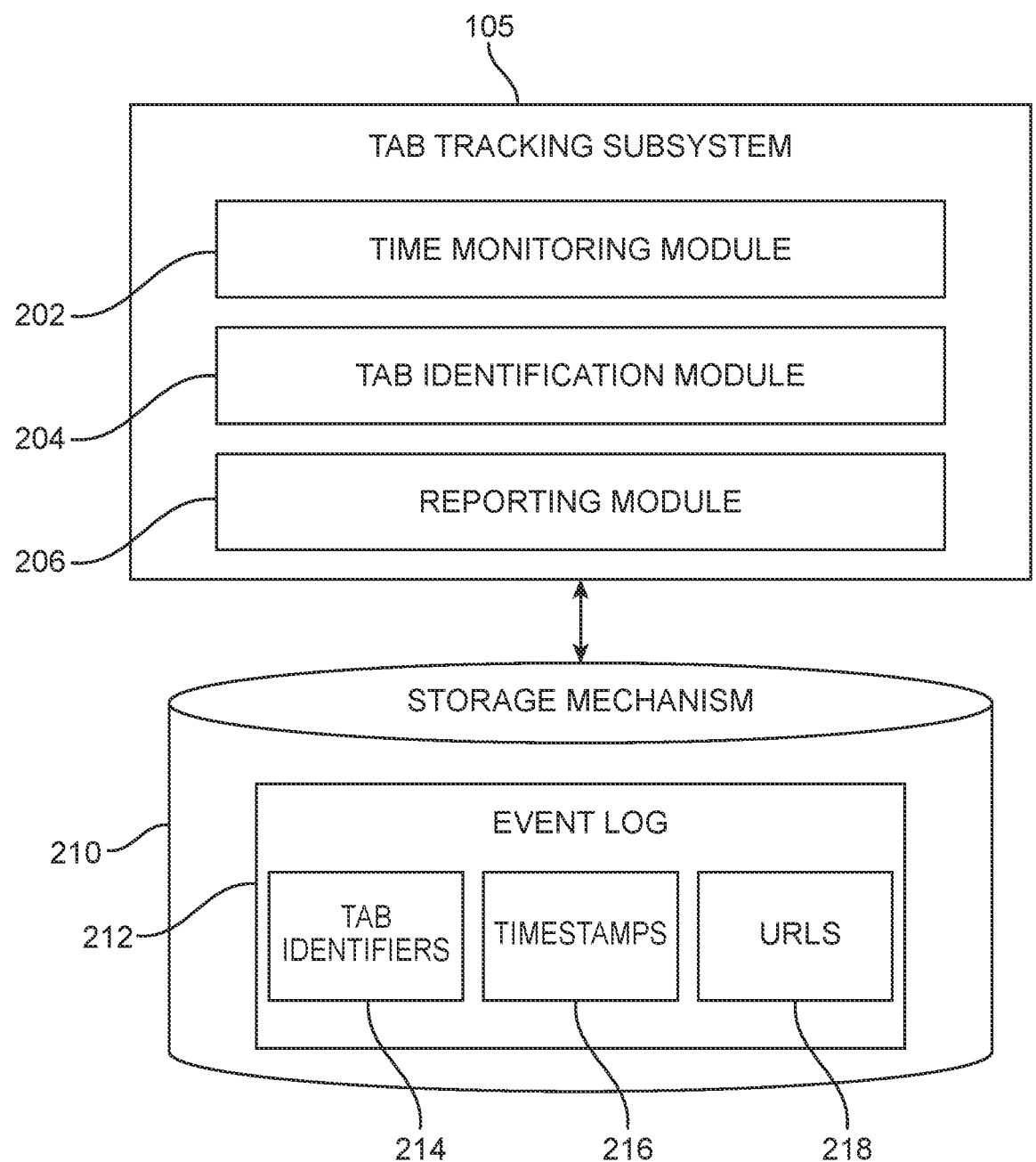
FIG. 2 is a block diagram showing additional components of the system environment of FIG. 1, according to certain aspects of the present disclosure.

The browsing device 102 may include a tab tracking subsystem 105 that tracks browsing activity across browser tabs, as described in further detail with respect to FIG. 2. In some implementations, as depicted in FIG. 1, the tab tracking subsystem 105 executes on the browsing device 102. For example, the tab tracking subsystem 105 may execute via a script running in the web browsing subsystem 103. Alternatively, or additionally, the tab tracking subsystem 105 can be implemented to execute on the content provider computing systems 104 or the clickstream analysis system 106.

FIG. 2 is a block diagram of the tab tracking subsystem 105. The tab tracking subsystem 105 shown in FIG. 2 includes a time monitoring module 202, a tab identification module 204, and a reporting module 206. The tab tracking subsystem 105 further includes, or is communicatively coupled to, a storage mechanism 210, which stores event logs 212. In other embodiments, the tab tracking subsystem 105 may include additional, fewer, or different components for various applications.

The tab identification module 204 is configured to identify which tab of a browser performs an action. The tab identification module 204 correlates each page load from the browser to the correct local browser tab. The tab identification module 204 executes a tab identification algorithm to identify the correct local browser tab for a particular loaded URL, as further described with respect to FIGS. 3-4. The tab identification module 204 assigns a browser tab identifier to each browser tab. The tab identification module 204 provides the browser tab identifier and associated data to the storage mechanism 210.

In some implementations, the tab tracking subsystem 105 further identifies and manages additional browsing data. The tab tracking subsystem 105 may track various clickstream data representing actions on a website, such as clicks, amount of time on a given page, a browser or device used, and so forth.

The time monitoring module 202 is configured to monitor times between various events tracked by the tab tracking subsystem 105. The time monitoring module 202 may execute a timer or coordinate with a timer executing on the browsing device 102 to identify times associated with events such as page loads, clicks, and so forth. The time monitoring module 202 may manage various threshold time intervals for performing tab tracking operations as described herein.

The tab tracking subsystem 105 may include, or be communicatively coupled to, one or more storage units on which various repositories, databases, or other data structures are stored. An examples of such a data structure is the storage mechanism 210. Storage units may store a variety of different types of data organized in a variety of different ways and from a variety of different sources. For example, the storage unit may include local storage stored to the device (e.g., browsing device 102) executing the tab tracking subsystem 105. Alternatively, or additionally, the storage mechanism 210 may include storage other than the primary storage located on the device executing the tab tracking subsystem 105 that is directly accessible by processors located therein. In some aspects, the storage mechanism 210 may include secondary, tertiary, or auxiliary storage, such as large hard drives, servers, virtual memory, among other types. The storage mechanism 210 may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices. In some aspects, the storage mechanism 210 can also store any intermediate or final data generated by one or more components of the computing environment 100.

The storage mechanism 210 may be located on the browsing device 102, on an external system, or some combination thereof. In some embodiments, the storage mechanism 210 may comprise a session storage associated with a browser. The session storage may be configured to store information related to a single browser tab. The session storage may store a browser tab identifier for the browser tab. Alternatively, or additionally, the storage mechanism 210 may comprise a local storage associated with a browser. The local storage may be storage local to a browser. The local storage may be configured to store information related to browser tabs for a browser. The local storage may be shared across tabs for a given domain. The local storage may store browser tab identifiers and timestamps for each browser tab.

Alternatively, or additionally, the storage mechanism 220 may include a web server. Alternatively, or additionally, the storage mechanism 220 includes other storage mechanisms within the browser, which may include Web Workers API and/or Database API (IndexedDB). For the case of the tab tracking subsystem executing via a single-thread script, Web Workers can be used to create a separate thread for tab tracking, which can improve the time-window-based tab updating techniques described herein. In other implementations, the storage mechanism 220 includes cookies.

The event log 212 is configured to store event data for events tracked by the tab tracking subsystem 105. The events can include clickstream events such as URLs 218 that are loaded and clicks on a browser (e.g., clickstream data). The event log 212 may further store timestamps 216 generated by the time monitoring module 202 and tab identifiers 214 managed by the tab identification module 204. In some aspects, the event log 212 may store such event data on a per-session basis.

Figure 5A:
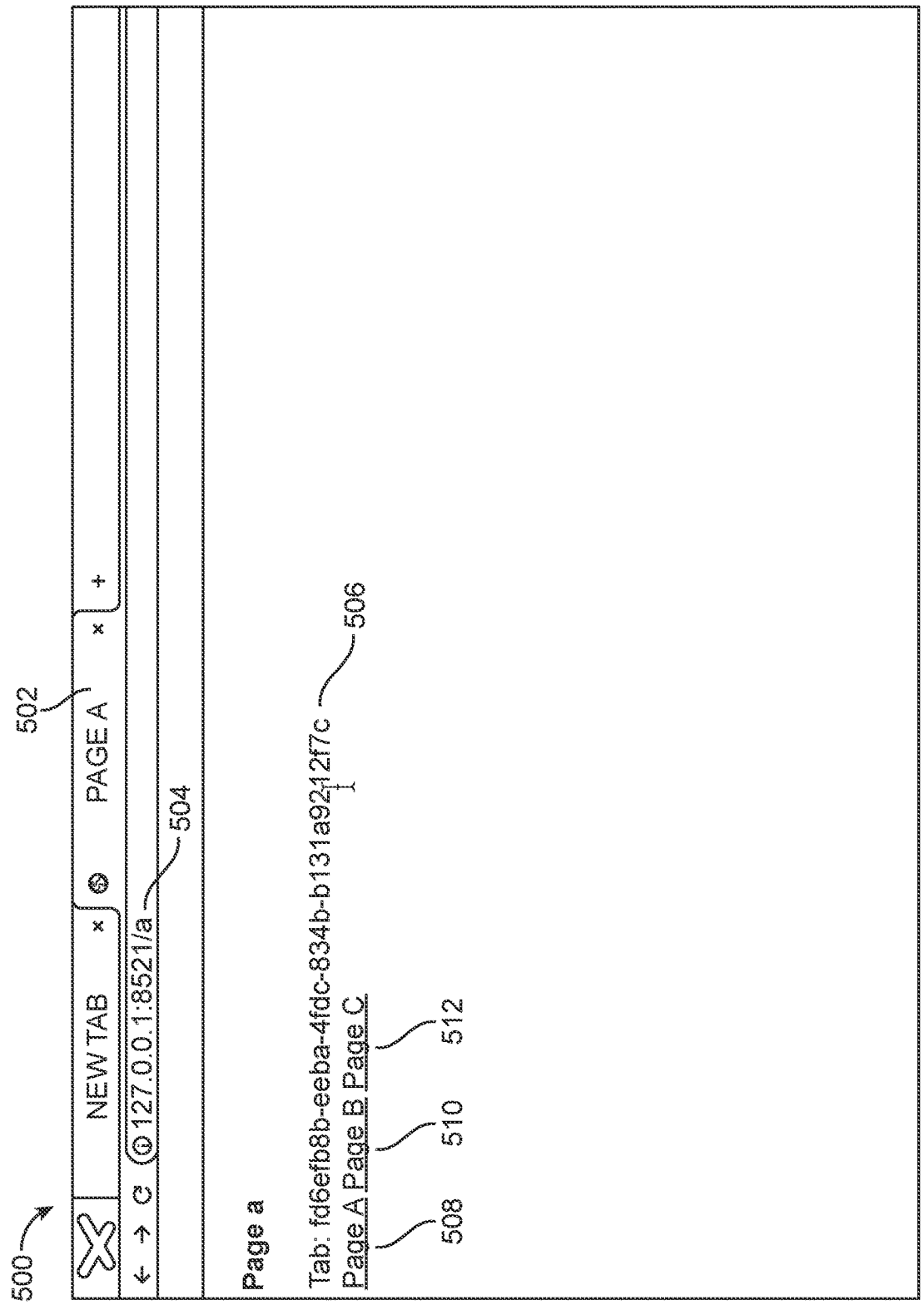
FIGS. 5A-5C illustrate browser tabs as tracked using the techniques described with respect to in FIGS. 3 and 4, according to certain aspects of the present disclosure.
Figure 5B:
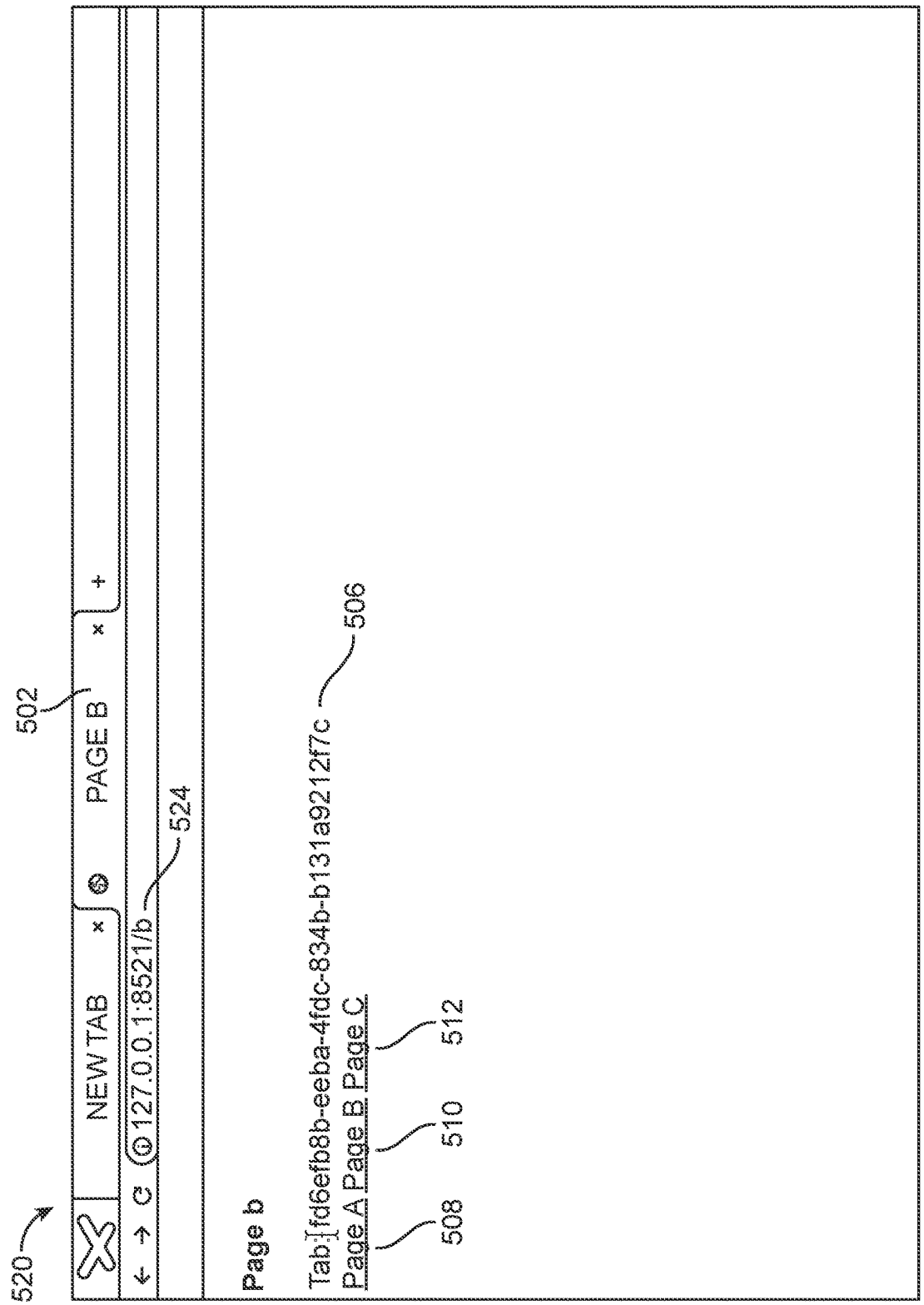
Figure 5C:
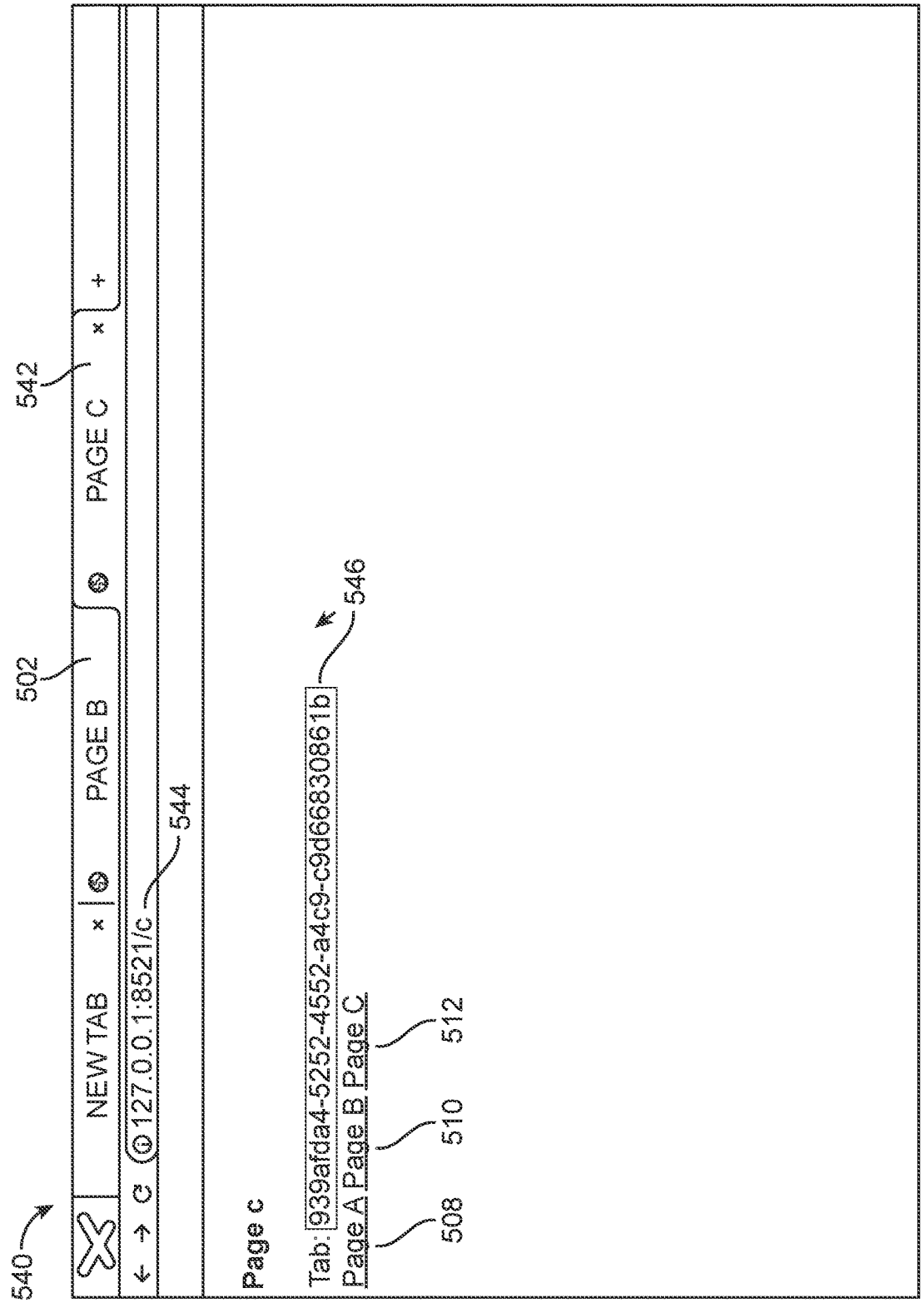

The event log 212 of the storage mechanism 210 stores tab identifiers 214. The tab identifiers 214 identify browser tabs. A tab identifier 214 may, for example, be a string of characters, as shown in FIGS. 5A-5C. The tab identifiers 214 may identify which local browser tab was used to perform an action. Each browser tab may be assigned its own unique tab identifier 214. The tab identifiers 214 may be stored in association with related data, which may include timestamps 216, URLs 218, performed actions, and other suitable data.

The timestamps 136 are stored times associated with the browser tabs being tracked. In some embodiments, the tab tracking subsystem 105 stores a last seen time for each browser tab. The last seen time can be periodically updated based on a preconfigured time window. For example, the tab tracking subsystem 105 may query the event log 212 after a configured time interval has elapsed, and update the last seen time if appropriate, as further described with respect to FIGS. 3 and 4.

The tab identifiers 134 may further be stored in association with URLs 218. The tab tracking subsystem 105 may store to the event log 212 URLs 218 or other suitable identifiers that indicate a web page that is loaded on a particular browser tab.

The event log 212 may further store other suitable clickstream data associated with the browser tabs. The event log 212 may store data characterizing links that are interacted with, content items include on the web site, and so forth. In some implementations, the event data stored in the event log 212 may be provided to another computing device, such as the clickstream analysis system 106 and/or content provider computing systems 104, for analysis.

The reporting module may report tab tracking data as stored to the event log 212, and potentially other clickstream data tracked by the tab tracking subsystem 105, to the clickstream analysis system 106 for further processing. In some implementations, the tab tracking subsystem 105 is a script executing on the browsing device, which gathers data and transmits the data to the clickstream analysis system 106 to perform further analysis.

Returning to FIG. 1, the clickstream analysis system 106 may include one or more computing devices configured to analyze event data. The clickstream analysis system 106 may perform analysis such as predictive modeling, risk analysis, and the like, based on the gathered tab tracking data and other clickstream data gathered on the browsing device 102. The analysis may include evaluating the timing and sequence of actions performed on each local browser tab to identify potentially fraudulent or bot activity, or for any other suitable purpose.

Techniques for Clickstream Tracking Across Browser Tabs

Figure 3:
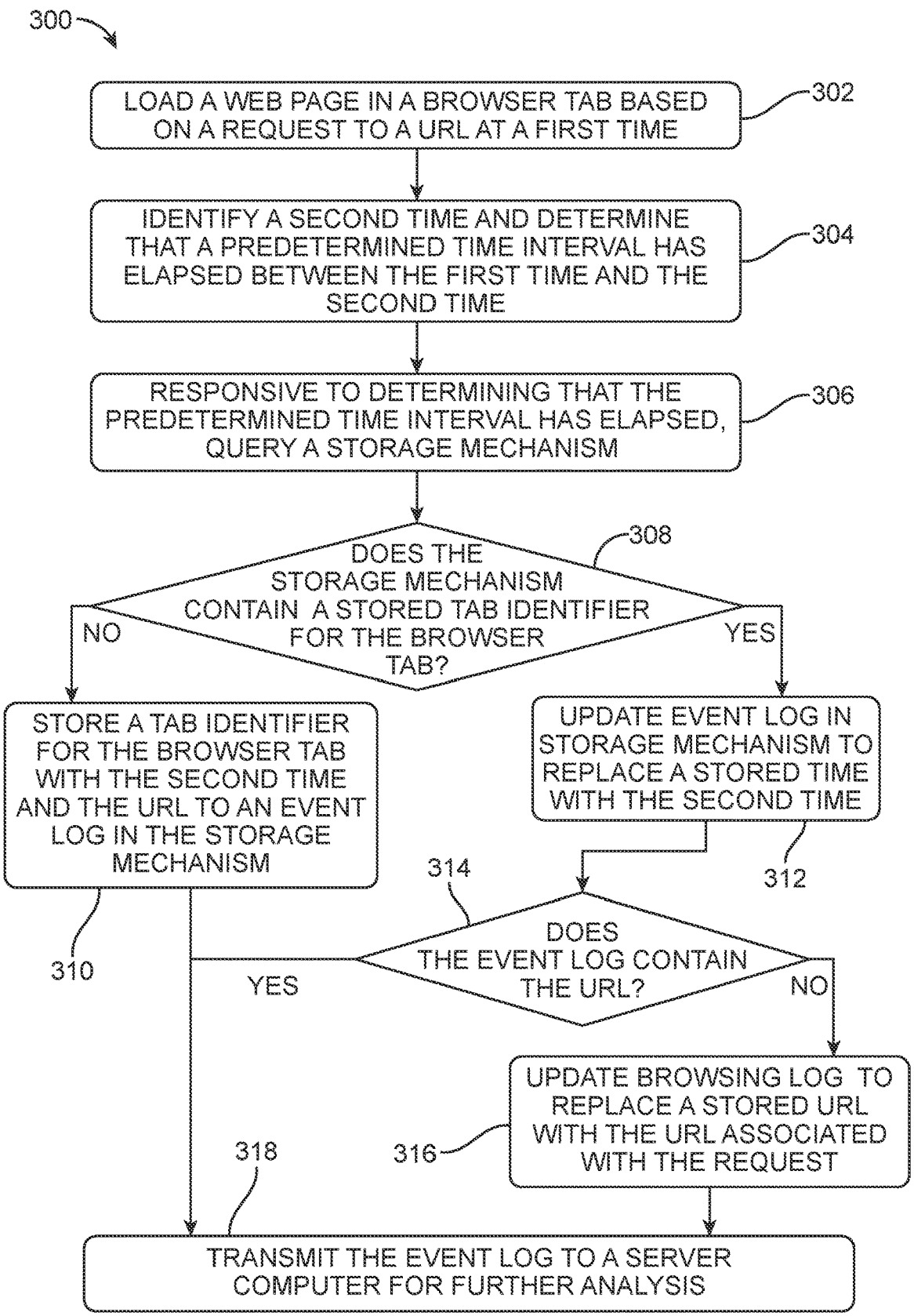
FIG. 3 depicts an example of a process for clickstream tracking across browser tabs, according to certain aspects of the present disclosure.

FIG. 3 is a flowchart of a method 300 for clickstream tracking across browser tabs, in accordance with an embodiment. The process shown in FIG. 3 may be performed by components of an online system (e.g., the tab tracking subsystem 105 in cooperation with other components of the computing environment 100). Other entities may perform some or all of the steps in FIG. 3 in other embodiments. Embodiments may include different and/or additional steps or perform the steps in different orders.

At block 302, the system (e.g., the web browsing subsystem of the browsing device 102) loads a web page in a browser tab based on a request to a URL at a first time. The request may be a request to serve the web page. The request may, for example, be transmitted from a browsing device to a content provider computing system responsive to detecting a user click on a link embedded in another web page or typing the URL into a navigation bar. In some aspects, the request is a Hyper Text Transfer Protocol (HTTP) request. The request may be initiated via a browser tab. The system may serve the HTTP request to a content provider computing system, which serves the web page to the browsing device. The browsing device may then load the web page in the browser tab.

At block 304, the tab tracking subsystem identifies a second time and determines that a predetermined time interval has elapsed between the first time and the second time. In some implementations, the tab tracking subsystem waits for a configured wait time of $t_w$ seconds. After waiting $t_w$ seconds, the tab tracking subsystem proceeds to block 306. In some embodiments, the wait time may be between 1-2 seconds, 500 milliseconds (ms)-5 seconds, or any other suitable length of time. The wait time can be selected based on an average wait time for data transmissions to the storage mechanism. The wait time can be adjusted depending on the storage mechanism used. For example, if the event data is stored locally on the client device, then a relatively short wait time may be appropriate. If the event data is stored to an external server or database, then a relatively long wait time may be appropriate to account for latencies in retrieving data from the storage mechanism.

At block 306, responsive to determining that the predetermined time interval has elapsed, the tab tracking subsystem queries a storage mechanism. After waiting $t_w$ seconds after the page load, the tab tracking subsystem may query the storage mechanism to determine whether a tab identifier associated with the browser tab used to load the web page is stored to the event log. As described above with respect to FIG. 1, the storage mechanism includes an event log which stores event data including tab identifiers. The tab tracking subsystem may execute a query on the storage mechanism 210 to determine whether a tab identifier corresponding to the browser tab is stored therein.

At block 308, the tab tracking subsystem determines whether the storage mechanism contains a stored tab identifier for the browser tab. The tab tracking subsystem may make the determination based on the time stored to the event log in association with the stored tab identifier. If the difference between the second time identified at block 304 (e.g., the current time) and the stored time (e.g., the last seen time recorded for the tab) is greater than the wait time $t_w$ for one tab identifier, but not any other tab identifiers, stored in the event log, then that tab identifier is determined to be the tab identifier for the browser tab loading the web page.

Another case in which the tab identifier for the browser tab used to load the web page is determined to be stored to the storage mechanism is as follows. If the difference between the second time identified at block 304 (e.g., the current time) and the stored time (e.g., the last seen time recorded for the tab is greater than the wait time $t_w$ for more than one tab identifier in the event log, then the tab identifier with the greatest difference between the second time and the stored time is determined to be the tab identifier for the browser tab. Having the greatest time difference may indicate that, if several hyperlinks were clicked on in different browser tabs in quick succession, the tab identifier having the greatest time difference was the first browser tab to load.

Alternatively, in some embodiments, the tab tracking subsystem may select the stored tab identifier corresponding to a smallest difference between the second time and the stored time, which may address the scenario of a user closing several tabs, then clicking a hyperlink. If there is a tab identifier stored in association with the browser tab, then the tab tracking subsystem proceeds to block 312.

If the difference between the second time identified at block 304 (e.g., the current time) and the stored time (e.g., the last seen time recorded for the tab) is less than the wait time $t_w$ for all browser tab identifiers in the event log, then the tab tracking subsystem determines that all of the tab identifiers are being used by active browser tabs. This indicates that there is not a tab identifier stored in association with the browser tab. If there is not a tab identifier stored in association with the browser tab, then the tab tracking subsystem proceeds to block 310.

At block 310, the tab tracking subsystem stores a tab identifier for the browser tab, with the second time and the URL, to an event log in the storage mechanism. The tab tracking subsystem may create a new entry in the event log and store the tab identifier in association with the second time and the URL corresponding to the browser tab. In some embodiments, before storing the tab identifier for the browser tab, the tab tracking subsystem generates the tab identifier for the browser tab. The tab tracking subsystem may, for example, execute a random number generator to generate a new browser tab. Alternatively, or additionally, the tab tracking subsystem can retrieve the tab identifier from a lookup table, generate a cryptographic key to use for the tab identifier, or other suitable means of generating the tab identifier.

The tab tracking subsystem assigns the tab identifier to the browser tab. If the tab tracking subsystem created a new tab identifier, the system assigns the new tab identifier to the browser tab. If the system did not create a new tab identifier, the system may assign an existing browser tab identifier from the event log to the browser tab serving the http request.

In some cases, a new tab identifier is generated even if the tab identifier is stored to the event log. This may be performed in the event that duplicate tabs are used. If a tab has been duplicated, there can be two tabs opened with the same tab identifier. The tab tracking subsystem may identify a duplicate tab by inspecting the storage mechanism to identify whether another tab has recently updated the tab identifier. For example, the tab tracking subsystem queries a local storage and identifies the stored tab identifier associated with a timestamp more recent than a threshold, as described in further detail below with respect to FIG. 4. This can indicate that the tab identifier has been updated in association with another browser tab. If the tab identifier in association with another browser tab, then the tab tracking subsystem can determine that the tab has been duplicated. In this case, the tab tracking subsystem generates a new tab identifier for the duplicated tab. The tab tracking subsystem stores an entry to the event log corresponding to the new tab identifier for the second tab. The original tab identifier may remain stored to the event log in association with the other tab. Thus, the duplicated tabs can be discerned from one another. In some implementations, both session and local storage are used for the storage mechanism to handle such cases of tab duplication. Techniques using session and local storage to track events across browser tabs are described in further detail below with respect to FIG. 4.

At block 312, the tab tracking subsystem updates the event log in the storage mechanism to replace a stored time with the second time. The tab tracking subsystem may identify the entry in the event log, based on the identified tab identifier. The tab tracking subsystem may update the stored time by saving the second time in association with the tab identifier. This stored second time is the last seen time of the tab, which can be used to further manage the tab identifier storage by keeping the tab identifiers up-to-date, as further described below.

At block 314, the tab tracking subsystem determines whether the event log contains the URL used to load the web page at block 302. The tab tracking subsystem may traverse the event log to inspect the stored URL mapped to the tab identifier. If the stored URL stored to the event log in association with the tab identifier matches the URL used to load the web page at block 302, then the URL stored to the event log may be deemed up-to-date, and the tab tracking subsystem proceeds to block 318. If the stored URL is different than the URL used to load the web page at block 302, then the event log should be updated to reflect the URL used to load the web page at block 302, and the tab tracking subsystem proceeds to block 316.

At block 316, the tab tracking subsystem updates the event log in the storage mechanism to replace a stored URL with the URL used to load the web page at block 302. The tab tracking subsystem may overwrite the stored URL with the URL associated with the request in the event log.

In some embodiments, the tab tracking subsystem purges tab identifiers from the storage mechanism based on a configured expiry time. The tab tracking subsystem may purge any tab identifiers deemed expired. For example, a configured expiry time $t_e$ is used to determine whether a given tab identifier should be purged from the event log. In some embodiments, the expiry time $t_e$ may be between 5-10 seconds, 1-30 seconds, or any other suitable length of time. The expiry time $t_e$ is longer than the wait time $t_w$. As described above with respect to the wait time at block 304, the expiry time may also be adjusted to account for latencies associated with the storage mechanism implemented.

The tab tracking subsystem may compare the second time (e.g., a current time corresponding to a given tab) to the stored timestamp for each stored tab identifier (e.g., the last seen time for that tab). This comparison is performed for each tab identifier stored to the event log. If the difference between the second time and the stored time for any tab identifier is greater than the expiry time $t_e$, then the tab tracking subsystem purges that tab identifier. The tab tracking subsystem may purge a tab identifier by deleting the tab identifier from the event log. In the purging process, in some implementations, associated data is also deleted (e.g., the timestamp, the URL, and any other event data stored in association with the purged tab identifier).

At block 318, the tab tracking subsystem transmits the event log to a server computer for further analysis. The tab tracking subsystem may transmit some or all of the data in the event log to the clickstream analysis system for analysis. Alternatively, or additionally, the tab tracking subsystem transmits some or all of the data in the event log to a content provider computing system for further analysis. The data in the event log may be analyzed by the clickstream analysis computing system or the content provider computing system to identify potentially fraudulent behavior, bot activity, or for any other suitable purpose.

The analysis may include analyzing a pattern of URLs, timestamps, and tab identifiers to check for anomalous browsing activity. For example, the clickstream analysis computing system applies one or more machine learning models that have been trained to predict anomalous browsing activity, based on the tab identifiers, URLs, timestamps, and potentially other clickstream data. Patterns of opening pages including tab information may, for example, reveal whether the pattern of browsing data is indicative of bot activity or activity of a human user. In some implementations, the tab tracking data may be used as input to a predictive model used for passive user authentication by comparing detected event data with prior behavior associated with a user. By including the tab data, more accurate results can be obtained, reducing false positives and false negatives. The results of such analysis may be used to control what information is displayed or otherwise provided via the web site. For example, an authenticated user is granted access to secure data based on the event data enriched with tab information, whereas, if the event data indicates that the user should not be authenticated, the secure data is not provided. Thus, the tab data can be used to improve the security of online interactions via the improved accuracy of the analysis performed using event data including tab tracking data.

The tab tracking subsystem may perform periodic updates to refresh the timestamps for each tab identifier stored to the event log. The tab tracking subsystem may periodically "phone-home," which corresponds to the tab tracking subsystem periodically determining that a configured phone-home interval has elapsed and that the browser tab is open. This can be triggered by any open browser tabs sending a phone-home signal based on determining that the phone-home interval $t_p$ has elapsed. The tab tracking subsystem may use a timer to identify a current time, and compare that current time to the second time. If the difference between the current time and the second time exceeds the phone-home interval, then the tab tracking subsystem determines that the phone-home interval has elapsed. In some embodiments, the phone-home interval may be between 300-600 ms, between 100 ms-1 second, or any other suitable length of time. The phone-home interval should be shorter than the wait time $t_w$ used at block 304. As described above with respect to the wait time at block 304, the phone-home interval may also be adjusted to account for latencies associated with the storage mechanism implemented. Upon determining that the phone-home interval has elapsed, the timestamp stored to the event log in association with the tab identifier for that tab is updated, so that the last-seen time of the tab is up-to-date. This regular phone-home process continues until either the tab is closed or the tab makes a new request to load a web page.

The processing of FIG. 3 may be performed repeatedly as new requests are used to load additional web pages. In one example, first, the user navigates to an initial URL in a new tab, responsive to which a new tab identifier is stored to the event log (e.g., by executing blocks 302-310). The system loads a first web page in a browser tab based on a request to a first URL at a first time at 302 and identifies a second time and determines that a predetermined time interval has elapsed between the first time and the second time at 304. Responsive to determining that the predetermined time interval has elapsed, the system queries the storage mechanism and determines that an event log stored to the storage mechanism does not contain a stored tab identifier for the browser tab at 308 (decision "no"). The tab tracking subsystem stores a tab identifier for the browser, mapped to the second time and the first URL, to the event log at 310.

Continuing the example, the user then navigates to a new URL in the same tab. The URL is updated in the event log (e.g. by executing blocks 302-308 and 312-316). The system loads a second web page in the browser tab based on a request to a second URL at a third time at 302. The tab tracking subsystem identifies a fourth time and determines that the predetermined time has elapsed between the third time and the fourth time at 304. Responsive to determining that the predetermined time interval has elapsed, the tab tracking subsystem queries the storage mechanism and determines that the event log contains the stored tab identifier for the browser tab at 306 and 308 (decision "yes"). The tab tracking subsystem updates the event log in the storage mechanism to replace the second time with the fourth time and the first URL with the second URL at 314-316 (decision "no," as the second URL was not previously stored to the event log). The event log may then be transmitted for further analysis at 318.

Continuing the example, the timestamps may then be updated after storing the second URL and the fourth timestamp. The tab tracking subsystem identifies a fifth time and determines that a second predetermined time interval has elapsed between the fourth time and the fifth time. This second time interval can correspond to the phone-home interval as described above. Responsive to determining that the second predetermined time interval has elapsed, the tab tracking subsystem queries the storage mechanism and determines that the event log contains the stored tab identifier for the browser tab, and updates the event log in the storage mechanism to replace the fourth time with the fifth time. Thus, the last seen time in the event log is updated after the phone-home interval has elapsed. This may be periodically repeated each time the phone-home interval once again elapses.

Figure 4:
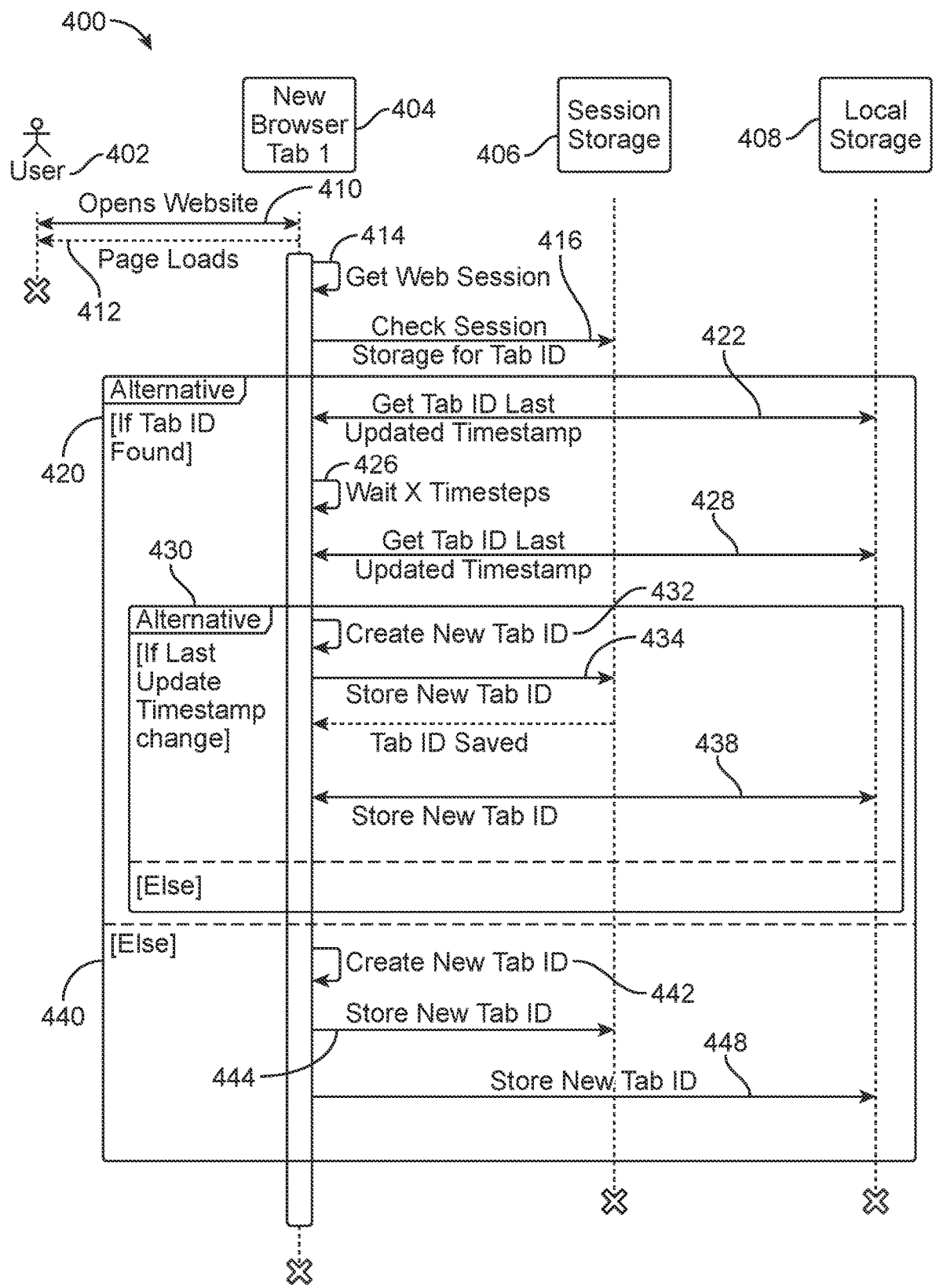
FIG. 4 illustrates an example of a process for clickstream tracking across browser tabs using session and local storage, according to certain aspects of the present disclosure.

FIG. 4 is a diagram depicting a method 400 for tracking browsing activity across browser tabs using session storage and local storage, in accordance with some embodiments. In the implementation depicted in FIG. 4, the storage mechanism includes both a session storage 406 and a local storage 408. The use of both session storage and local storage can help to more accurately track browsing activity across tabs.

For example, some browsers allow users to duplicate a browser tab, which may also duplicate the tab identifier such that the tabs cannot be distinguished. Session storage may store data specific to a single tab without the ability to store data pertaining to other tabs. Thus, data stored to session storage may not be shared across tabs, and only be accessible to the tab that corresponding to the session. Session storage is useful for storing the tab identifier, as the session storage is specific to the tab and it is relatively straightforward to identify data corresponding to a tab in the session storage. When duplicating a tab, some browsers duplicate the session storage mechanism with the duplication of the tab, so that the same tab identifier is associated with multiple tabs.

Local storage can be used to store data across tabs because the local storage is shared across tabs for a given domain. Local storage is suitable for identifying information such as how many tabs are open. To identify duplicate tabs, in some embodiments, the tab tracking subsystem queries the local storage to identify whether a tab identifier has been updated using a different tab than a detected tab. If so, a new tab identifier can be generated for the duplicate tab. If the browser tab identifier in the session storage exists for a different browser tab in the local storage, then the tab identification module may assign a new browser tab identifier to the duplicated browser tab, so that the events across the duplicated tabs are tracked accurately.

The process shown in FIG. 4 may be performed by components of an online system (e.g., tab tracking subsystem 105 in cooperation with other components of the computing environment 100). Other entities may perform some or all of the steps in FIG. 4 in other embodiments. Embodiments may include different and/or additional steps or perform the steps in different orders. The method 400 may be performed responsive to a user 402 interacting with a browsing device (e.g., browsing device 102 of FIG. 1) to load a browser tab 404. The tab tracking subsystem may be implemented as a script executing on the browser tab 404.

At 410, the user 402 opens a website and at 412, a web page loads on the browser tab 404. This may be performed in a similar fashion as described above with respect to block 302 of FIG. 3. At 414, a web session is initiated. The tab tracking subsystem may initiate a web session, which is used to group a set of events that are detected in a time frame. For example, the session can contain multiple page views, social interactions, and ecommerce transactions, and web page loads across multiple tabs.

At 416, the tab tracking subsystem determines whether a tab identifier exists for the tab in the session storage. The tab tracking subsystem may query the session storage 406 to check for a tab identifier for the browser tab 404.

If a tab identifier is found at 416, then the method 400 proceeds to block 420. At 422, the tab tracking subsystem retrieves the tab identifier and last updated timestamp from the local storage 408. The last updated timestamp represents the last stored time associated with the tab (e.g., the stored time, as described at block 312 of FIG. 3).

At 426, the tab tracking subsystem waits for X time steps. For example, the tab tracking subsystem waits for the wait time or the phone-home interval described above with respect to FIG. 3. The tab tracking subsystem may wait while refraining from updating the event log in association with the new browser tab 404.

After waiting at 426, the tab tracking subsystem queries the local storage 408 to retrieve the last updated timestamp for the tab identifier. The tab tracking subsystem checks the local storage 408 to determine whether there are any updates to the event log in association with the tab identifier. If there are updates to the event log in association with the tab identifier, then the tab tracking subsystem can determine that another tab is also using the same tab identifier. This indicates that the tab was duplicated, and the method proceeds to block 430 to generate a new tab identifier for the duplicated tab.

Block 430 is executed if the last update timestamp changes. This may indicate that the same tab has been duplicated. At 432, a new tab identifier is created. As described above with respect to block 310 of FIG. 3, a tab identifier can be generated using a random number generator, look-up table, or other suitable techniques. At 434, the tab tracking subsystem stores the new tab identifier to the session storage 406. The new tab identifier is further saved to the local storage 408 at 438.

Block 440 is executed if a tab identifier is not identified at 416. This indicates that a new tab has been opened that does not have a tab identifier in the session storage. Thus, a new tab identifier should be generated and saved for that tab. At 442, a new tab identifier is created. As described above with respect to block 310 of FIG. 3, a tab identifier can be generated using a random number generator, look-up table, or other suitable techniques. At 444, the tab tracking subsystem stores the new tab identifier to the session storage 406. The new tab identifier is further saved to the local storage 408 at 448.

Thus it is advantageous to leverage both session storage and local storage. The tab tracking subsystem can use both session storage and local storage to assign a tab identifier to a browser tab and then track a user's behavior, page transitions, and so forth in the context of one or more tabs. The session storage can be checked first to identify page transitions, and the local storage can be checked subsequently to identify a new tab opening event. Thus, to more accurately track the tabs, the tab identifier is stored to both the local storage and the session storage.

Browser Tab Examples

FIGS. 5A-5C illustrate web pages loaded in different browser tabs, as may be tracked using the techniques described above with respect to FIGS. 3 and 4. FIG. 5A may represent a screenshot of a web browser at a first time, FIG. 5B may represent a screenshot of the web browser at a second time, and FIG. 5C may represent a screenshot of the web browser at a third time.

In FIG. 5A, a web browser 500 at a first time is shown. The web browser includes multiple browser tabs used to load content for display. Browser tab 502 is one of the browser tabs, and a web page, Page A, is loaded to the browser tab 502 via URL 504. A web page corresponding to the URL 504 is displayed in the web browser 500. The web page includes a set of links—a link to Page A 508, a link to Page B 510, and a link to Page C 512. A tab identifier 506 is further shown for illustrative purposes, although this may not necessarily be displayed on the web browser.

In FIG. 5B, a web browser 520 at a second time is shown. The web browser includes the same browser tab 502 included in the web browser 500 at the first time. At the second time, the web browser has loaded a second web page, Page B, to the browser tab 502 via a different URL 524 from the URL 504 corresponding to Page A as shown in FIG. 5A. A web page corresponding to the URL 524 is displayed in the web browser 500. The web page includes a set of links—a link to Page A 508, a link to Page B 510, and a link to Page C 512. A tab identifier 506 is further shown for illustrative purposes, although this may not necessarily be displayed on the Web browser. Since the browser tab 502 shown in FIG. 5B is the same as the browser tab 502 shown in FIG. 5A, the tab identifier 506 is also the same.

In FIG. 5C, a web browser 540 at a third time is shown. The web browser includes the same browser tab 502 included in the web browser 500 at the first time and in the web browser 520 at the second time. An additional browser tab 542 is also opened in the web browser 540. At the third time, the web browser has loaded a third web page, Page C, to the browser tab 542 via a URL 544. A web page corresponding to the URL 544 is displayed in the web browser 540. The web page includes a set of links—a link to Page A 508, a link to Page B 510, and a link to Page C 512. A tab identifier 546 is further shown for illustrative purposes, although this may not necessarily be displayed on the web browser. Since the browser tab 542 shown in FIG. 5C is different from the browser tab 502 shown in FIGS. 5A and 5B, the tab identifier 546 shown in FIG. 5C is different from the tab identifier 506 shown in FIGS. 5A and 5B.

Computing System Example

Figure 6:
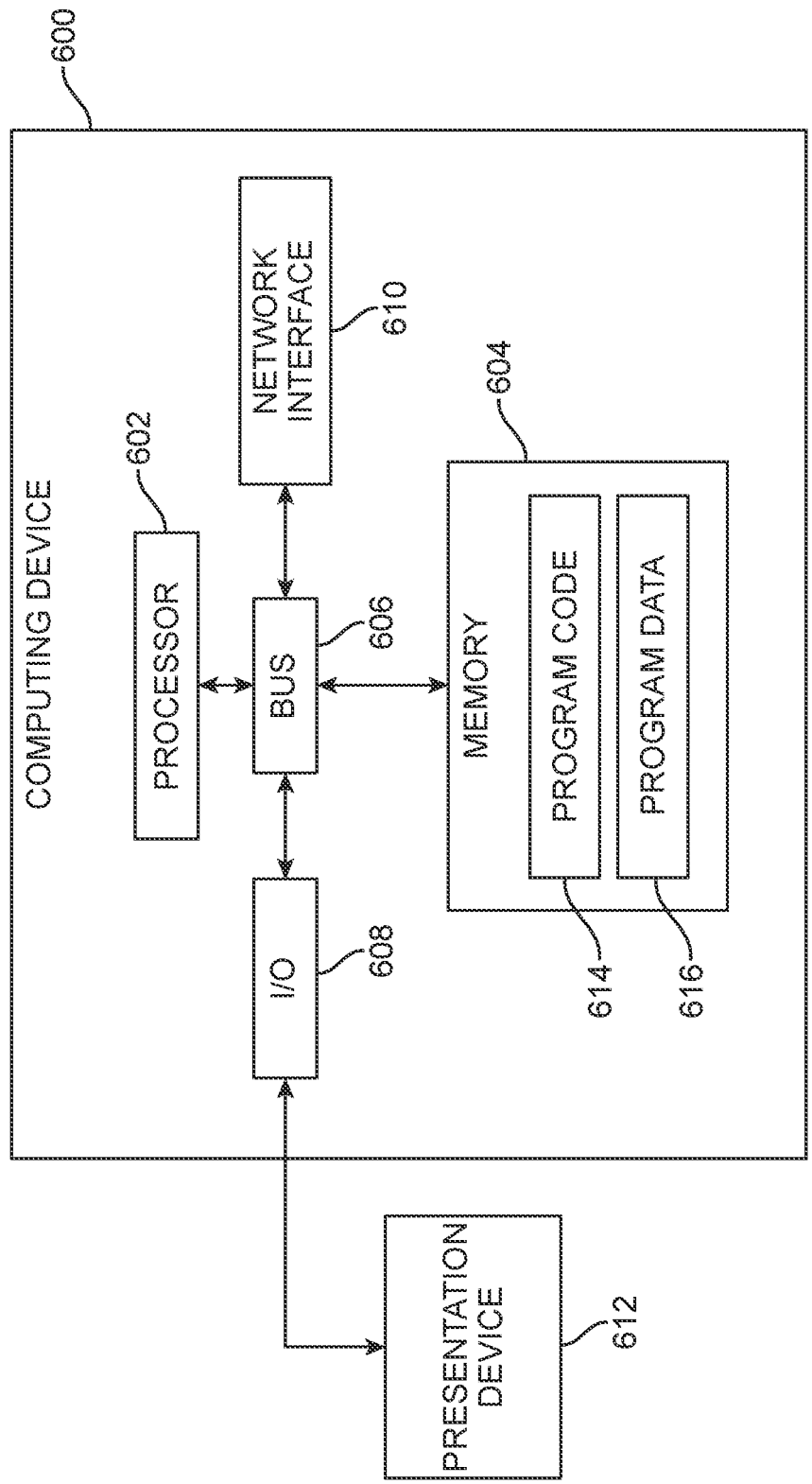
FIG. 6 depicts an example of a computing system suitable for implementing aspects of the techniques and technologies presented herein.

Any suitable computing system or group of computing systems can be used to perform the operations described herein. For example, FIG. 6 is a block diagram depicting an example of a computing system 600 that can be used to implement one or more of the systems depicted in FIG. 1 (e.g., a browsing device 102, a content provider computing system 104, a clickstream analysis system 106, etc.). The example of the computing system 600 can include various devices for communicating with other devices in the computing environment 100, as described with respect to FIG. 1. The computing system 600 can include various devices for performing one or more of the operations described above.

The computing system 600 can include a processor 602, which includes one or more devices or hardware components communicatively coupled to a memory 604. The processor 602 executes computer-executable program code 605 stored in the memory 604, accesses program data 607 stored in the memory 604, or both. Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The computing system 600 can execute program code 605. The program code 605 may be stored in any suitable computer-readable medium and may be executed on any suitable processing device. For example, as depicted in FIG. 6, the program code for the model-development engine 116 can reside in the memory 604 at the computing system 600. Executing the program code 605 can configure the processor 602 to perform one or more of the operations described herein.

Program code 605 stored in a memory 604 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Examples of the program code 605 include one or more of the applications, engines, or sets of program code described herein, such as web browsing subsystem 103, tab tracking subsystem 105, etc.

Examples of program data 607 stored in a memory 604 may include one or more databases, one or more other data structures, datasets, etc. For instance, if a memory 604 is a may include a storage mechanism 210 storing tab identifiers 214, timestamps 216, and URLs 218.

The computing system 600 may also include a number of external or internal devices such as input or output devices. For example, the computing system 600 is shown with an input/output interface 608 that can receive input from input devices or provide output to output devices. A bus 606 can also be included in the computing system 600. The bus 606 can communicatively couple one or more components of the computing system 600.

In some aspects, the computing system 600 can include one or more output devices. One example of an output device is the network interface device 610 depicted in FIG. 6. A network interface device 610 can include any device or group of devices suitable for establishing a wired or wireless data connection to one or more data networks (e.g., network 108). Non-limiting examples of the network interface device 610 include an Ethernet network adapter, a modem, etc. Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

The invention claimed is:

1. A system comprising:
   one or more processors;
   one or more non-transitory memories coupled to the one or more processors, the one or more memories storing:
   a storage mechanism comprising an event log; and
   a plurality of instructions executable by the one or more processors to perform processing comprising:
   loading a first web page in a browser tab based on a request to a first Uniform Resource Locator (URL) at a first time;
   identifying a second time and determining that a predetermined time interval has elapsed between the first time and the second time;
   responsive to determining that the predetermined time interval has elapsed, querying the storage mechanism and determining that the storage mechanism does not contain a stored tab identifier for the browser tab;

storing a tab identifier for the browser tab, mapped to the second time and the first URL, to the event log in the storage mechanism;

loading a second web page in the browser tab based on a request to a second URL at a third time;

identifying a fourth time and determining that the predetermined time interval has elapsed between the third time and the fourth time;

responsive to determining that the predetermined time interval has elapsed, querying the storage mechanism and determining that the event log contains the stored tab identifier for the browser tab;

updating the event log to replace the second time with the fourth time and the first URL with the second URL; and transmitting the event log to a server computer for further analysis.

2. The system of claim 1, wherein the predetermined time interval is a first predetermined time interval, the plurality of instructions further executable by the one or more processors to perform processing comprising:

identifying a fifth time and determining that a second predetermined time interval has elapsed between the fourth time and the fifth time;

responsive to determining that the second predetermined time interval has elapsed, querying the storage mechanism and determining that the event log contains the stored tab identifier for the browser tab; and updating the event log in the storage mechanism to replace the fourth time with the fifth time.

3. The system of claim 1, wherein the tab identifier is stored to both a local storage associated with a browser and to a session storage associated with the browser.

4. The system of claim 1, the plurality of instructions further executable by the one or more processors to perform processing comprising:

responsive to determining that the event log contains the stored tab identifier for the browser tab, querying a local storage and identifying the stored tab identifier associated with a timestamp more recent than a threshold;

generating a new tab identifier for a second tab; and storing an entry to the event log corresponding to the new tab identifier for the second tab.

5. The system of claim 1, wherein the further analysis comprises analyzing a pattern of URLs, timestamps, and tab identifiers to check for anomalous browsing activity.

6. The system of claim 1, the plurality of instructions further executable by the one or more processors to perform processing comprising:

purging tab identifiers from the storage mechanism based on a configured expiry time.

7. The system of claim 1, the plurality of instructions further executable by the one or more processors to perform processing comprising:

generating the tab identifier for the browser tab.

8. A computer-implemented method comprising:

loading a first web page in a browser tab based on a request to a first Uniform Resource Locator (URL) at a first time;

identifying a second time and determining that a predetermined time interval has elapsed between the first time and the second time;

responsive to determining that the predetermined time interval has elapsed, querying a storage mechanism and determining that an event log stored to the storage mechanism does not contain a stored tab identifier for the browser tab;

storing a tab identifier for the browser tab, mapped to the second time and the first URL, to the event log;

loading a second web page in the browser tab based on a request to a second URL at a third time;

identifying a fourth time and determining that the predetermined time interval has elapsed between the third time and the fourth time;

responsive to determining that the predetermined time interval has elapsed, querying the storage mechanism and determining that the event log contains the stored tab identifier for the browser tab;

updating the event log in the storage mechanism to replace the second time with the fourth time and the first URL with the second URL; and transmitting the event log to a server computer for further analysis.

9. The method of claim 8, wherein the predetermined time interval is a first predetermined time interval, the method further comprising:

identifying a fifth time and determining that a second predetermined time interval has elapsed between the fourth time and the fifth time;

responsive to determining that the second predetermined time interval has elapsed, querying the storage mechanism and determining that the event log contains the stored tab identifier for the browser tab; and updating the event log in the storage mechanism to replace the fourth time with the fifth time.

10. The method of claim 8, wherein the tab identifier is stored to both a local storage associated with a browser and to a session storage associated with the browser.

11. The method of claim 8, further comprising:

responsive to determining that the event log contains the stored tab identifier for the browser tab, querying a local storage and identifying the stored tab identifier associated with a timestamp more recent than a threshold;

generating a new tab identifier for a second tab; and storing an entry to the event log corresponding to the new tab identifier for the second tab.

12. The method of claim 8, wherein the further analysis comprises analyzing a pattern of URLs, timestamps, and tab identifiers to check for anomalous browsing activity.

13. The method of claim 8, further comprising:

purging tab identifiers from the storage mechanism based on a configured expiry time.

14. The method of claim 8, further comprising:

generating the tab identifier for the browser tab.

15. A non-transitory computer-readable medium storing program code executable by one or more processing devices to perform operations comprising:

loading a first web page in a browser tab based on a request to a first Uniform Resource Locator (URL) at a first time;

identifying a second time and determining that a predetermined time interval has elapsed between the first time and the second time;

responsive to determining that the predetermined time interval has elapsed, querying a storage mechanism and determining that an event log stored to the storage mechanism does not contain a stored tab identifier for the browser tab;

storing a tab identifier for the browser tab, mapped to the second time and the first URL, to the event log;

loading a second web page in the browser tab based on a request to a second URL at a third time;

identifying a fourth time and determining that the predetermined time interval has elapsed between the third time and the fourth time;

responsive to determining that the predetermined time interval has elapsed, querying the storage mechanism and determining that the event log contains the stored tab identifier for the browser tab;

updating the event log in the storage mechanism to replace the second time with the fourth time and the first URL with the second URL; and transmitting the event log to a server computer for further analysis.

16. The non-transitory computer-readable medium of claim 15, wherein the predetermined time interval is a first predetermined time interval, the operations further comprising:

identifying a fifth time and determining that a second predetermined time interval has elapsed between the fourth time and the fifth time;

responsive to determining that the second predetermined time interval has elapsed, querying the storage mechanism and determining that the event log contains the stored tab identifier for the browser tab; and updating the event log in the storage mechanism to replace the fourth time with the fifth time.

17. The non-transitory computer-readable medium of claim 15, wherein the tab identifier is stored to both a local storage associated with a browser and to a session storage associated with the browser.

18. The non-transitory computer-readable medium of claim 15, the operations further comprising:

responsive to determining that the event log contains the stored tab identifier for the browser tab, querying a local storage and identifying the stored tab identifier associated with a timestamp more recent than a threshold;

generating a new tab identifier for a second tab; and storing an entry to the event log corresponding to the new tab identifier for the second tab.

19. The non-transitory computer-readable medium of claim 15, wherein the further analysis comprises analyzing a pattern of URLs, timestamps, and tab identifiers to check for anomalous browsing activity.

20. The non-transitory computer-readable medium of claim 15, the operations further comprising:

purging tab identifiers from the storage mechanism based on a configured expiry time.

* * * * *